(12) United States Patent
Bagal et al.

(10) Patent No.: US 10,346,150 B2
(45) Date of Patent: Jul. 9, 2019

(54) COMPUTERIZED SYSTEM AND METHOD FOR PATCHING AN APPLICATION BY SEPARATING EXECUTABLES AND WORKING DATA USING DIFFERENT IMAGES

(71) Applicant: ORACLE INTERNATIONAL CORPORATION, Redwood Shores, CA (US)

(72) Inventors: Prasad V. Bagal, Saratoga, CA (US); Samarjeet S. Tomar, Bangalore (IN); Harish Nandyala, Fremont, CA (US); Ankur Kemkar, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 15/142,233

(22) Filed: Apr. 29, 2016

(65) Prior Publication Data
US 2017/0115980 A1    Apr. 27, 2017

Related U.S. Application Data

(60) Provisional application No. 62/244,710, filed on Oct. 21, 2015.

(51) Int. Cl.
*G06F 8/65* (2018.01)
*H04L 29/08* (2006.01)

(52) U.S. Cl.
CPC .............. *G06F 8/65* (2013.01); *H04L 67/34* (2013.01); *H04L 29/08* (2013.01); *H04L 67/06* (2013.01)

(58) Field of Classification Search
CPC ... G06F 8/65; G06F 8/70; H04L 67/34; H04L 67/06
(Continued)

(56) References Cited

U.S. PATENT DOCUMENTS 8,661,459 B2 * 2/2014 Gandhi ................... G06F 21/51
                                                              719/328
9,678,740 B2 * 6/2017 Heine .................... G06F 16/214
(Continued)

OTHER PUBLICATIONS

Cadar et al, "Multi-version Software Updates", [Online], 2012, pp. 36-40, [Retrieved from internet on Feb. 7, 2019], <http://delivery.acm.org/10.1145/2670000/2664358/p36-cadar.pdf> (Year: 2012).*
(Continued)

*Primary Examiner* — Ziaul A Chowdhury
*Assistant Examiner* — Zengpu Wei
(74) *Attorney, Agent, or Firm* — Kraguljac Law Group, LLC

(57) ABSTRACT

Systems, methods, and other embodiments associated with separating executables and working data of an application between separate images are described. In one embodiment, a method includes mounting an application image together with a working image to create an application directory for an application. The application image is read-only and includes at least an executable of the application and the working image includes working data modified by the application. The application directory provides files and paths of the files for the application together within a single unified directory while separating the executable in the application image from the working data in the working image. The method includes in response to receiving a write request to the application directory, arbitrating access to the application directory by controlling the processor to write data for the write request to the working image to maintain the working data separate from the executable of the application.

20 Claims, 5 Drawing Sheets

(58) Field of Classification Search
USPC .................................................... 717/169
See application file for complete search history.

(56) References Cited

U.S. PATENT DOCUMENTS

| | | | | |
|---|---|---|---|---|
| 10,103,937 | B1* | 10/2018 | Thompson | H04L 41/0806 |
| 2006/0041662 | A1* | 2/2006 | Georgiev | G06F 8/60 |
| | | | | 709/226 |
| 2009/0248695 | A1* | 10/2009 | Ozzie | H04L 67/2861 |
| 2009/0271787 | A1* | 10/2009 | Clark | G06F 9/445 |
| | | | | 718/1 |
| 2010/0088281 | A1* | 4/2010 | Driesen | G06F 8/65 |
| | | | | 707/641 |
| 2010/0153341 | A1* | 6/2010 | Driesen | G06F 17/303 |
| | | | | 707/661 |
| 2010/0250825 | A1* | 9/2010 | Chen | G06F 17/30067 |
| | | | | 711/6 |
| 2010/0332505 | A1* | 12/2010 | Auer | G06F 17/30345 |
| | | | | 707/759 |
| 2012/0101998 | A1* | 4/2012 | Cahill | G06F 17/30356 |
| | | | | 707/654 |
| 2013/0103790 | A1* | 4/2013 | Gupta | G06F 8/65 |
| | | | | 709/217 |
| 2014/0237464 | A1* | 8/2014 | Waterman | G06F 8/65 |
| | | | | 717/172 |
| 2016/0034384 | A1* | 2/2016 | Ovcharik | G06F 21/552 |
| | | | | 714/38.11 |
| 2016/0234625 | A1* | 8/2016 | Wang | H04L 67/06 |
| 2016/0342404 | A1* | 11/2016 | Fawcett | G06F 9/50 |
| 2017/0171082 | A1* | 6/2017 | Jiang | H04L 67/325 |
| 2018/0025025 | A1* | 1/2018 | Davis | G06F 17/30203 |

OTHER PUBLICATIONS

Chen et al, "Dynamic Software Updating Using a Relaxed Consistency Model", [Online], 2011, pp. 679-694, [Retrieved from internet on Feb. 7, 2019], <https://ieeexplore.ieee.org/stamp/stamp.jsp?tp=&arnumber=5551162> (Year: 2011).*

Neamtiu et al, "Practical Dynamic Software Updating for C", [Online], 2006, pp. 72-83, [Retrieved form internet on Feb. 7, 2019], < http://delivery.acm.org/10.1145/1140000/1133991/p72-neamtiu.pdf> (Year: 2006).*

Docker; Understanding Docker; pp. 1-9; downloaded on Feb. 13, 2016 from http://docs.docker.com/engine/introduction/understanding-docker/#how-does-a-docker-image-work.

David Hendricks; The Translucent File Service; pp. 1-8; downloaded Apr. 7, 2016 from http://www.lockss.org/locksswp/wp.../02/TranslucentFileSystem.pdf; Sun Microsystems.

Wright et al.; Linux Journal; Kernel Korner—Unionfs: Bringing Filesystems Together; pp. 1-21; downloaded Feb. 13, 2016 from: http://www.linuxjournal.com/article/7714?page=0,1.

* cited by examiner

COMPUTERIZED SYSTEM AND METHOD FOR PATCHING AN APPLICATION BY SEPARATING EXECUTABLES AND WORKING DATA USING DIFFERENT IMAGES

CROSS REFERENCE TO RELATED APPLICATIONS

This disclosure claims the benefit of U.S. Provisional Patent Application Ser. No. 62/244,710 filed Oct. 21, 2015, titled "SOFTWARE LIFECYCLE MANAGEMENT USING OLFS BY SEPARATING SOFTWARE FROM APPLICATION DATA," inventors: Prasad BAGAL et al., and assigned to the present assignee.

BACKGROUND

Managing updates to an application can be a difficult task that is prone to many errors. One reason for these errors relates to how application software and application generated data are intermingled in storage. For example, when an application is installed and initially configured, a root directory for the application is generated in a file system. The root directory includes the software (i.e., executables) and application generated data stored together throughout the root directory and, for example, in various subdirectories. In some instances, the application generated data and the software may even be intermingled within a single file.

Updating the application is complicated by this intermingling of software and data since separating the data from the software is generally difficult and, thus, the update process may erroneously over-write the data or fail to copy portions of the data. For example, patching the application may occur using two different approaches. The first approach is referred to as out-of-place patching. Out-of-place patching generally includes installing a new copy of the application with the patch in a different location (e.g., different directory) than an existing version of the application. Patching the new copy of the application avoids difficulties with erroneously overwriting data during the patching process and/or difficulties with patching corrupted software. However, the data then needs to be copied from the original installation location to the new copy to maintain continuity in the operation of the application. As mentioned previously, differentiating the data from the software is difficult and can lead to missing data and/or misplaced data when attempting to copy the data to the new location.

The second approach is referred to as in-place patching. In-place patching entails installing a patch over existing portions of the software. While this approach maintains the same root directory, difficulties may occur relating to accidentally overwriting data because of the close intermingling of the software and the data while also potentially corrupting existing software. Additionally, rolling back the patch may also present similar difficulties when using in-place patching because of the intermingling of software with the data, and the previous version of the software being modified or overwritten during the installation. Accordingly, both forms of patching present difficulties that complicate managing software updates.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Computerized systems and methods are described herein that seamlessly and transparently separate executables and working data of an application to improve how the application is patched. As discussed in the background, in general, the executables and the working data of the application are intermingled within a root directory. That is, the various files of the application are stored together and are not generally separated according to whether a file is an executable or working data. Additionally, various portions of the working data and the executables may be co-mingled within a single file. As a result of the files being indistinguishably mixed together, patching the application can present many difficulties.

Accordingly, in one embodiment, a computing system separates the executables from the working data using separate images to store the respective data. For example, the computing system stores the executables in a first image and stores the working data in a second image. While storing different portions of the application across different locations may seem complex, the computing system is configured to provide seamless access to the separate images as though the images were a single application directory or image. For example, the computing system mounts the images together to form the application directory as a logical projection of the first image and the second image. In this way, the computing system provides the files of the separate images as though stored together in a single storage location while the files are actually maintained separately in the first image and the second image.

Consequently, when patching the application, the computing system may simply swap the first image that includes the executables with a patched image that includes a patched version of the executables. As a result of this swap, the application is patched while maintaining the application directory as the root directory and also maintaining existing data so as to maintain application state. Additionally, using the separate images permits the computing system to maintain the application image as read-only in order to maintain integrity and authenticity of the executables and thus avoid difficulties with patching existing corrupted executables. In this way, the computing system maintains the executables separate from the working data and transparently patches the application without pro-longed interruptions or complex re-configurations.

Figure 1:
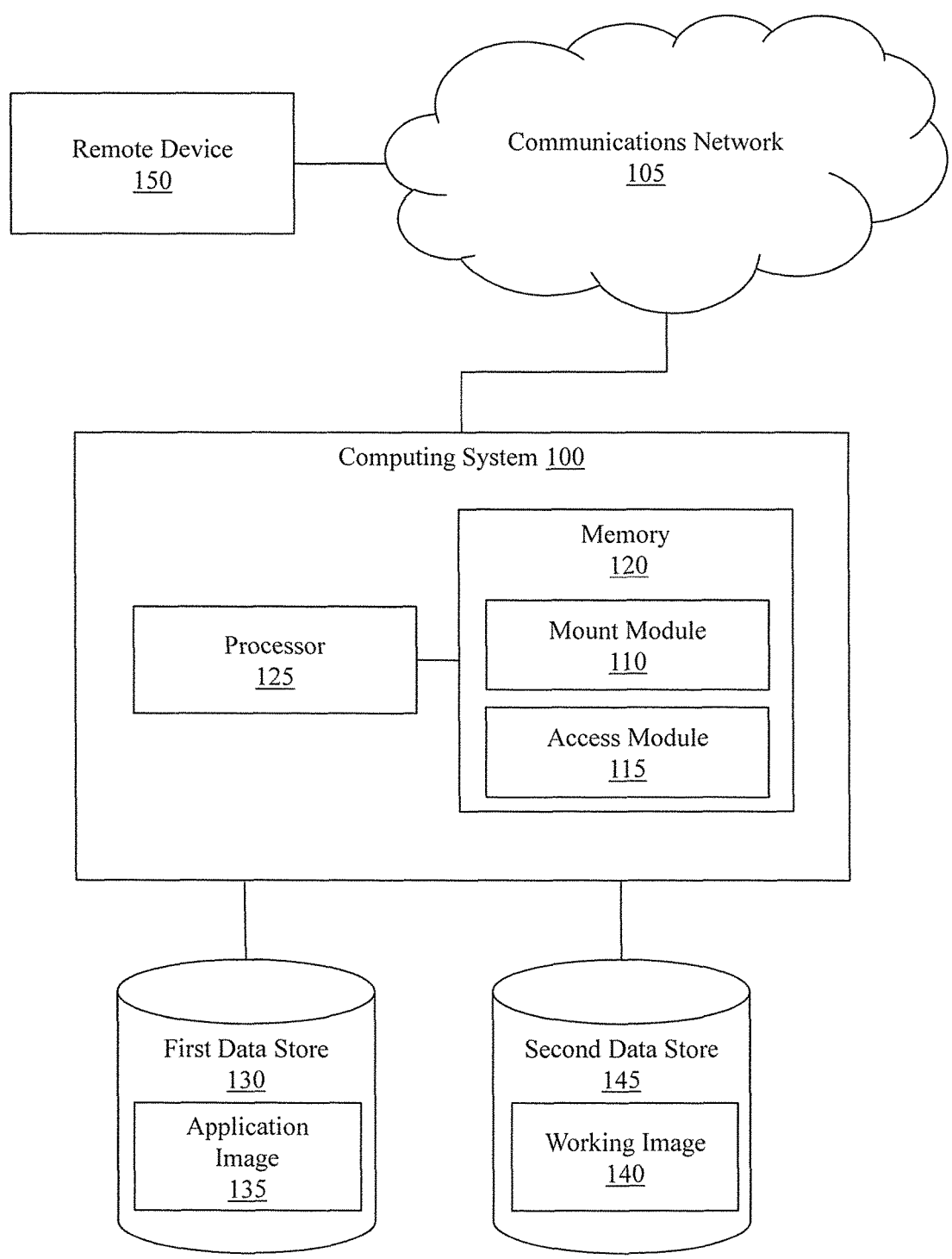
FIG. 1 illustrates one embodiment of a system associated with separating executables and working data of an application between images.

With reference to FIG. 1, one embodiment of a computing system 100 associated with separating executables from working data to provide seamless patching is illustrated. In one embodiment, the computing system 100 is a computing/data processing system including an application or collection of distributed applications for enterprise organizations. The applications and computing system 100 may be configured to operate with or be implemented as a cloud-based networking system, a software as a service (SaaS) architecture, or other type of networked computing solution. In one embodiment, the computing system 100 is a centralized server-side application that provides at least the functions disclosed herein and that is accessed by many users via computing devices/terminals communicating with the computing system 100 (functioning as the server) over a computer communications network 105.

In one embodiment, one or more of the components described herein are configured as program modules (e.g., mount module 110, access module 115) stored in a memory 120. The program modules are configured with instructions that when executed by at least a processor 125 cause the computing system 100 (e.g., personal computer, server, etc.) to perform the corresponding function(s).

For example, the computing system 100 includes the mount module 115 stored in the memory 120 that is communicably coupled to the processor 125. In one embodiment, the mount module 110 in combination with at least the processor 125 receives electronic communications (e.g. a communication including an application patch/image) from a remote device 150 over the electronic communications network 105, analyzes and transforms the electronic communications into electronic data structures and stores the electronic data structures in a data store 130. Additionally, in one embodiment, the mount module 110 generates electronic data structures including various metadata that define a file system for mounting an application image 135 together with a working image 140 to generate an application directory.

Furthermore, the access module 115 arbitrates access to the application directory by, for example, traversing the images to locate files in the data store 130 and/or a data store 145, modifying the metadata, moving files between the images 135 and 140, and so on. Thus, the disclosed functions are rooted in computer technology to achieve the ability to mount images and arbitrate access to stored data. Consequently, the mount module 110 and the access module 115 are tied to the computing system 100 to cause the computing system 100 to perform various novel functions as described herein.

FIG. 1 further illustrates the computing system 100 including the processor 125, which is a hardware processing unit, such as, a microprocessor, central processing unit (CPU), application-specific integrated circuit (ASIC), or similar hardware device. The processor 125 is connected via circuitry (e.g., a bus) to the memory 120 and to the first data store 130 and the second data store 145 via one or more input/output controllers. The memory 120 is, for example, a non-transitory memory such as a processor cache memory, a flash memory, a random access memory (RAM), or another memory that stores instructions executed by the processor 125 that comprise the mount module 110 and the access module 115.

Similarly, the first data store 130 and the second data store 145 are, for example, memories such as a random access memory (RAM), flash memory, hard-disk drives or similar volatile or non-volatile computer-storage media. Accordingly, the processor 125 uses the data stores 130 and 145 to store various data when performing the disclosed functions. As shown in FIG. 1, the first data store 130 and the second data store 145 are separate and distinct storage locations. Of course, in other embodiments, the first data store 130 and the second data store 145 may be combined into a single data store, may be implemented as a single component within the computing system 100 and so on.

In either case, the first data store 130 and the second data store 145 store the application image 135 and the working image 140, respectively. As used within this disclosure, an image refers to a distinct file system that stores files and metadata (file paths in a directory, administrative information, etc.) of the files used for tracking attributes and other administrative information about the files. In one embodiment, the application image 135 includes executables, such as, software binaries and scripts of dynamic libraries that comprise the application. These executables generally include instructions that are executed by the processor 125 as one or more processes to cause the computing device 100 to perform different functions/actions. Furthermore, while the single application image 135 is discussed, the first data store 130 may store multiple versions of the application image 135. That is, the first data store 130, in one embodiment, stores the application image 135 of an original version of the application (i.e., version 1.0), while also storing images with subsequent versions of the application. These subsequent versions may be embodied in patched images (not illustrated) that include patched versions (i.e., modified/updated versions) of the dynamic libraries and/or software binaries.

While the application image 135 and the patched images may store different iterations of the application, these images share the characteristic of being read-only. As used within this disclosure, read-only refers to a state in which the data that comprises the particular images are only read from the data store 130 and are not written to or modified in any way. That is, the application image 135 and the patched images are maintained in a read-only immutable state in order to prevent alteration of the stored files. By maintaining the application image 135 and the patched images in a read-only state, the computing system 100 guarantees the integrity and authenticity of the respective executables since they cannot be modified from an original form. Further aspects implementing the application image 135 using a read-only state will be discussed subsequently.

In addition to the executables stored in the application image 135, the application also comprises working data stored in the working image 140. The working image 140 is stored in the second data store 145 and includes non-executable data that is, for example, working data used or modified by the application during execution. The working data includes configurations files, trace logs, application state information and other non-executable data manipulated by executing processes of the application. For example, the configuration files specify particular configuration information for a specific installation, such as, resource identifiers/paths, user specific information, and so on. The trace logs store information to track changes, errors, and other information about the operation of the application. The application state information includes electronic data objects that track a state of the application, such as, end points of communications, process identifiers and other information generated by the application during execution and written to the working image 140. In general, the working data is data manipulated by the application that does not include actual executable binaries and functions that execute as processes of the application itself.

Because the application and other processes modify/write the working data during operation, the working image 140 is writable (i.e., modifiable). Additionally, similarly to the first data store 130, the second data store 145 stores multiple versions of the working image 140. In other words, a separate version of the working image 140 is generated for each version of the application. Additionally, the access module 115 only permits write access to a current/active working image 140 associated with a current patch. Previous versions of the working image 140 are switched into a read-only state once a new version of the application is installed. Thus, previous versions of the working image 140 are preserved to maintain previous versions of the working data that correlate with the application operating prior to being patched. Accordingly, the application may be rolled back to a previous version should an error or other issue exist in a current version by mounting a correct combination of images for the desired version.

Additionally, isolating software bits of the application from the working data for respective versions permits updating/patching of the software bits, as needed, without difficulties associated with attempting to copy the working data to a new location or concerns about the working data being overwritten in error. Accordingly, in one embodiment, the mount module 110 mounts the application image 135 and the working image 140 together by overlaying representations of the files and directory structures defined in the respective images. The mount module 110 generates a single unified directory, the application directory, by mounting the images together and presenting the application directory as a logical projection of the application image 135 and the working image 140. As a result, the application directory provides a representation of the mounted images as a single merged version of directories described by the mounted images.

Consequently, the mount module 110 provides transparent and seamless access to files and directories of the application as though the images were a single directory structure by mounting the directories together. However, the separate images are still maintained in respective storage locations and accessed via the access module 115. In essence, the mount module 110 and the access module 115 act as a mediator/arbitrator to the application directory. For example, in one embodiment, the mount module 110 and the access module 115 are embodied as a driver (i.e., process executing on the processor 125) that communicates with an operating system kernel to service requests to the application directory. In this way, the access module 115 intercepts the requests for different portions of the application and directs the requests to appropriate locations where they are maintained separately in the distinct images.

Figure 2:
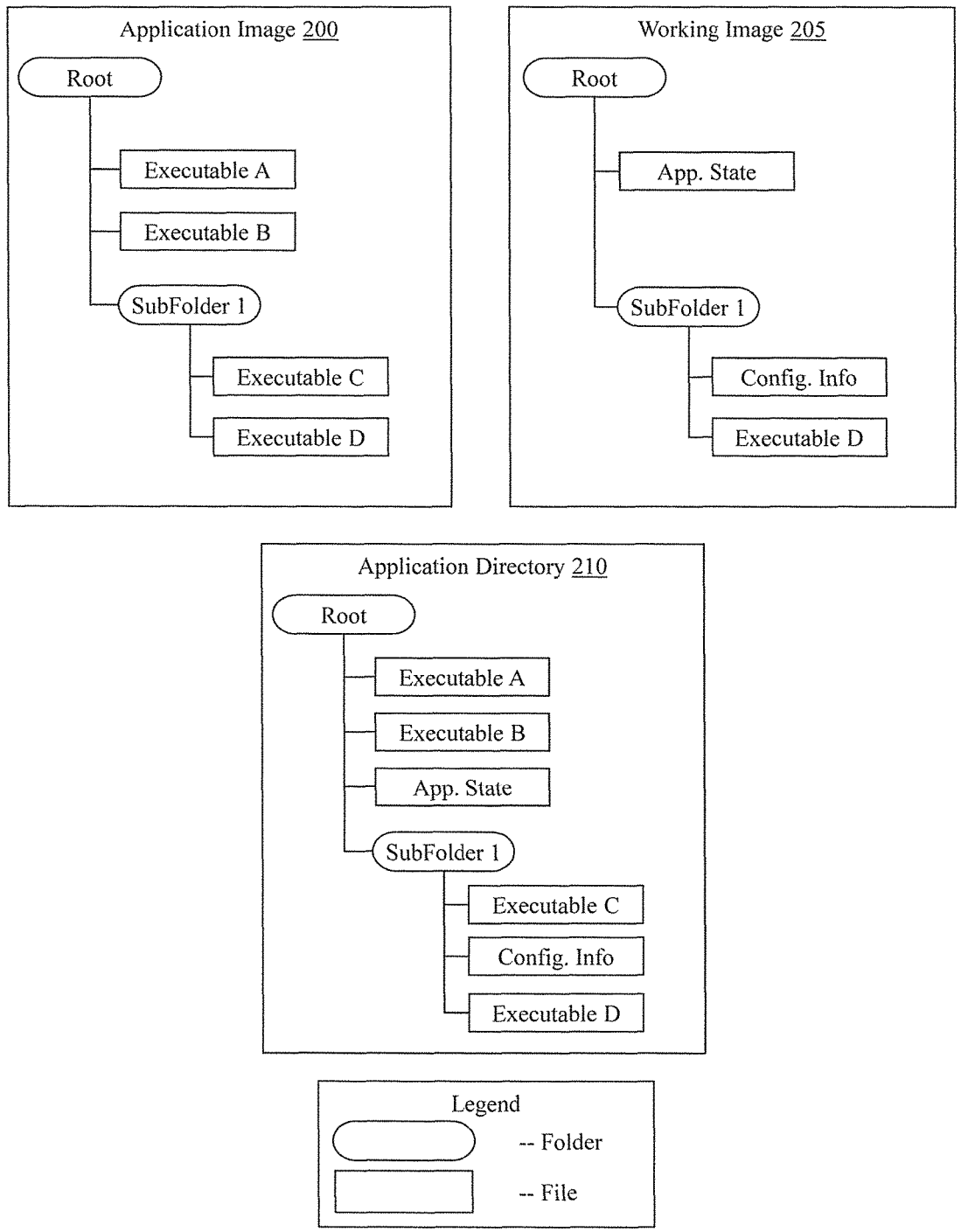
FIG. 2 illustrates one example of directory structures for an application image, working image and application directory.

To better understand how the mount module 110 of FIG. 1 mounts images together, consider FIG. 2. FIG. 2 illustrates a diagram representing directory structures and files of an application image 200 and a working image 205 as combined into an application directory 210. While the example of FIG. 2 illustrates two separate images, of course, as will be discussed in greater detail subsequently, multiple working images may be mounted together with a single application image. In either case, the functionality of mounting two images is the same as mounting three or more images together. Thus, two images are discussed for purposes of simplicity and brevity of this discussion.

As shown in FIG. 2, the application image 200 includes a directory structure comprising a "root" folder that includes a single subdirectory labeled "subfolder 1." For purposes of discussion, the application image 200 is illustrated as including several different executable files. For example, the application image 200 includes an Executable A and Executable B in the Root directory and an Executable C and Executable D in the subdirectory "SubFolder1." In general, the application image 200 also includes metadata describing the directory structure along with the files of the application themselves.

Additionally, the working image 205 includes a matching directory structure to the application image 200 that comprises the root directory including the single subdirectory "SubFolder1." While the application image 200 and the working image 205 are illustrated with an identical directory structure, of course, in other embodiments the structures may vary by overlapping in part (i.e., overlapping root directories). Moreover, as briefly mentioned previously, multiple versions of the working image 205 may be mounted along with the application image 200 when, for example, the application image 200 embodies a subsequent patched version of the application. This is because application state data, configuration information and other application data that is modified, at least in part, over time with each subsequent version of the application is embodied by the intervening versions of the working images 205.

Accordingly, each subsequent version of the working image 205 generally represents a state of the application data as the data was modified during execution of a respective version while data that was not modified is maintained in a read-only state in prior versions of the working image 205. Thus, mounting the multiple versions of the working image 200 provides a logical projection of a most recent version of the working data as it exists across the multiple versions of the working image 205.

For example, when mounting the application image 200 with the working image 205, the mount module 110 generates the application directory 210 as a merged version of the directories of the two images. That is, the root or home directory is merged to include all files and sub-directories of each image. In the example of FIG. 2, the mount module 110 generates the application directory 210 by merging the files of both images into a single logical root directory as seen with the application directory 210.

In a similar manner, the mount module 110 merges/projects overlapping sub-directories, as seen with the sub-directory "SubFolder1." Additionally, files within the sub-directories are merged/projected into a same sub-directory in the application directory 210. Additionally, when files with the same file name exist at identical directory paths in multiple images, a single version of the file is projected in the application directory 210. Thus, the access module 115 provides access to one of the files when such conflicts occur. In one embodiment, the access module 115 resolves such conflicts between identical files by providing access to a most recent version and/or to a version that is in a most recent version of the working image 205 when, for example, multiple versions of the working image 105 are mounted together.

As one example of a conflict between two files, the application image 200 and the working image 205 both include a file named "Executable D." However, the application directory 210 displays a single copy of the file "Executable D." This is because the mount module 110 generates the application directory to display/project a single version of the file when conflicts exist. As previously mentioned, the mount module 110 merges (i.e., logically projects) the images 200 and 205 together to create the application directory 210. When performing this function, the mount module 110 identifies conflicting files and lists the file once in the application directory 210. Thereafter, the access module 115 provides access to the version of "Executable D" that is in the working image 205. The access module 115 provides access in this way since, for example, files within the working image 205 are given priority and generally represent a most recent copy of the file.

Further consider an example where an additional working image 205' (not illustrated) is mounted between the application image 200 and the working image 205. In this example, assume that the contents of the working image 205' are identical to the contents of the working image 205 except for a file labeled "error record A" in the working image 205' root directory. Thus, the working image 205' represents working data from a previous version of the application that is mounted along with the application image 200 and the working image 205. Accordingly, a resulting application directory would also display the file labeled "error record A" when mounting the working image 205' with the other two images. However, because newer versions of the other files from the working image 205' have already been written to the working image 205, the files from the working image 205 would be given priority access over conflicting files from the working image 205'. In this way, the working data from previous versions is maintained with new versions of the application such that the application need not be reconfigured or working data need not be copied from prior installations while also preserving the previous versions of the working data to permit rolling back a version of the application.

Furthermore, when servicing requests to the application directory the access module 115 generally locates files between the images and directs the requests to appropriate storage locations (i.e., to either data store 130 or data store 145). In this way, the access module 115 can re-direct requests to appropriate locations for the files and also control which file is accessed when conflicts exist.

Additionally, while the application image 200 is discussed as including executables/software of the application and the working image 205 is discussed as including application data, in some instances, the working image 205 may also include executables/software. For example, when installation of the application includes a selection of additional options for the application, additional libraries that include executables will be written to the working image 205. This is because the application image 200 is maintained in a read-only state to maintain the integrity of the base executables/software that are stored in the application image 200. Thus, in some instances, executable/software bits are written to the working image 205. However, it should be noted that the executable/software bits that are written to the working image 205 are particular to that version and installation of the application. Accordingly, the working image 205 still retains the characteristic of storing elements particular to a specific installation and version of the application. Further aspects of the application image 200 and the working image 205 will be discussed subsequently with reference to FIGS. 3 and 4.

Figure 3:
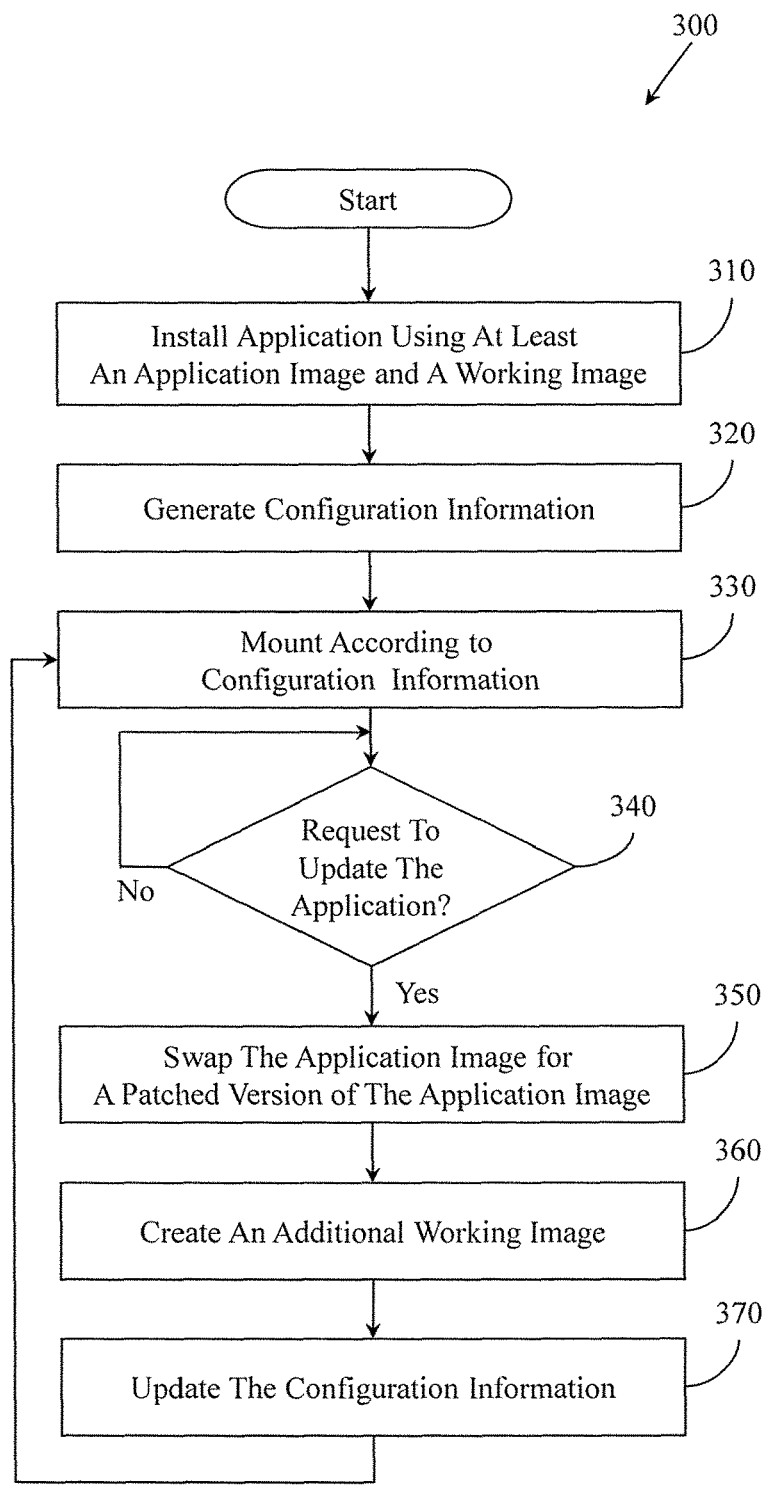
FIG. 3 illustrates one embodiment of a method associated with installing and patching an application using multiple images.
Figure 4:
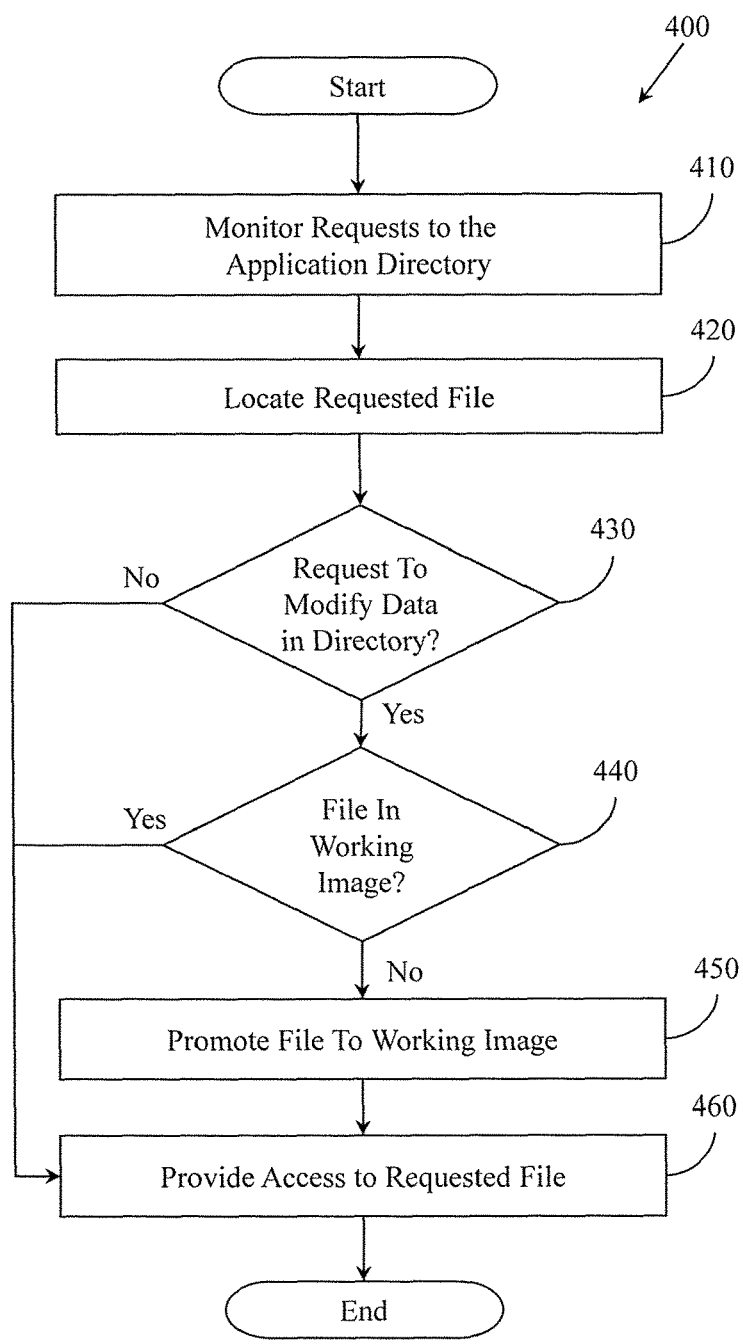
FIG. 4 illustrates one embodiment of a method associated with arbitrating access to an application directory that separately stores executables and working data in different images.

As a brief overview, FIG. 3 illustrates a method associated with installing and patching an application using separate images for different portions of the application. FIG. 4 generally illustrates one method of controlling access to the images when executing an application that is installed across multiple images.

Accordingly, with reference to FIG. 3, one embodiment of a method 300 associated with separating executables and working data of an application is illustrated. For purposes of discussion, method 300 will be described from the perspective of the computing system 100 of FIG. 1. Of course, the method 300 is not limited to operating within the environment described in relation to the computing system 100, but is discussed in the present context for purposes of brevity and clarity of discussion.

Method 300 initiates when, for example, an electronic input is received in the computing system 100 that activates the mount module 110 to install an application. In one embodiment, the communication is the application itself, while in other embodiments the communication is a trigger signal that causes the method 300 to begin.

Additionally, as used in this disclosure, application refers to a group of coordinated computerized functions, tasks, or activities that operate on electronic data through the processor 125 to cause the computing system 100 to generate various outputs or actions as a result. Furthermore, in one embodiment, the application is comprised of different portions. As previously discussed, the separate portions of the application generally include the executables and the working data. It should be appreciated that the separate aspects of the application function as a whole to makeup the application, and, while discussed as being stored separately, are generally understood as being installed together to comprise the application.

Accordingly, at 310, method 300 initiates in response to the electronic input by installing the application. In one embodiment, installing the application includes creating electronic data structures for the application image and the working image, copying files of the application into the application image and storing application images in a memory.

Thus, in one embodiment, the mount module 110 creates the electronic data structures in, for example, the first data store 130 and the second data store 145. In general, the mount module 110 creates the images by generating electronic data structures including metadata describing a file system (i.e., files and directory structure) of data being stored along with, for example, additional administrative data. In general, the images are distinct file systems that include the files of the application, metadata, indices of the stored files, and so on.

In one embodiment, after generating the image files, the mount module 110 identifies, for example, the executable files versus working data (non-executable) of the application by parsing files and analyzing contents of each of the files (e.g., ".exe" file vs ".cfg" file). That is, identifying the different files for the different images may include the mount module 110 identifying file types (executable, configuration, dynamic linked libraries, XML, Data, text, etc.) or file characteristics that categorize a file according to executable or non-executable. Subsequently, the mount module 110 selectively copies executable files into the application image 135 and working data into the working image 140 while preserving a directory structure of both. In this way, the mount module 110 separates the two sets of files into the respective images to install the application.

Alternatively, to avoid the difficulty of parsing the files to identify and separate the different types of files, in one embodiment, the working data is separated from the executables using mechanisms of the access module 115.

For example, in the instant embodiment, the mount module 110 does not parse through the application files to identify executables from non-executables. Instead, the mount module 110 installs all files of the application into the application image 135. Thereafter, the access module 115 promotes (i.e., copies) files individually from the application image 135 into the working image 140 when modification of a respective file is requested. In this way, the computing system 100 promotes files into the working image 140 as the files are needed and avoids storing additional copies of files that may not be modified in the working image 140. Similarly, if the application image 135 includes a patched version of the executables and a prior working image 140' (not illustrated) exists, then files are individually promoted from the working image 140' to the working image 140 as write requests for the respective files are received. Promoting files to the working image 140 will be discussed in greater detail in relation to method 400 of FIG. 4, subsequently.

At 320, configuration information is generated. In one example, the configuration information is stored in a home configuration file (HCF) within the working image 140. The configuration information includes, for example, information that identifies characteristics about a current installation of the application. For example, the configuration information includes an identifier of a current version of the application, a home directory path of the application, an identifier of the application image 135, an identifier of a set of working images, metadata identifying a creation date and/or patch identifier, an identifier of an original working image and an identifier of an active working image.

As stated, the configuration information includes the identifier of the set of working images along with the identifier of the application image 135. The set of working images are relevant in relation to an application that has been patched and not an application that is newly installed. With a newly installed copy of the application, there are generally two images, the application image 135 and a single version of the working image 140.

Accordingly, as will be discussed in greater detail subsequently, each subsequent version of the application includes an additional working image to which data is written, while previous versions of the working image 140 are preserved as read-only. For example, the original application includes two images (application image and working image), a second version includes three images (application image, previous working image and current working image), and so on. In this way, the mount module 110 preserves the working data associated with each version of the application. Consequently, the mount module 110 can revert/rollback the application to a previous version by selectively mounting a respective application image and different sets of working images that correlate with the particular application image.

At 330, the application image 135 and the working image 140 are mounted together according to the configuration information to create an application directory. In one embodiment, the mount module 110 mounts the images by parsing configuration information, identifying images for the current version of the application from the configuration information, locating the images, analyzing the images to identify files and directory structures/hierarchies, and creating the application directory by generating an electronic data structure that includes a description of the merged/projected directories and listing of files.

In one embodiment, the mount module 110 mounts the images together using a union file system. That is, the mount module 110, in one embodiment, implements a union file system that is used to mount the separate images together into a single directory hierarchy (i.e., the application directory). In other words, the mount module 110 implements a file system in which distinct file systems/directory hierarchies (also referred to as branches) can be transparently overlaid with one another to logically project a single coherent file system (i.e., the application directory).

In this way, the mount module 110 unites the distinct images including the files and paths of the files to generate the application directory that presents the images as though they are unified while actually maintaining the images separately. Consequently, the images can be managed separately to ensure the application image 135 is immutable and read-only while the active working image 140 accepts all write requests for the application. Through these mechanisms implemented using the mount module 110, the root directory of the application can be maintained across different versions of the application.

As previously discussed, the configuration information identifies images and a priority of images that are to be mounted together to provide a particular version of the application. Further aspects of mounting additional images together to form the application directory will be discussed subsequently.

Continuing with method 300, at 340, requests are monitored to determine when a request to update the application is received. In one embodiment, monitoring, at 340, includes listening for communications identifying that a patch is ready to install, parsing incoming communications to identify whether a communication is a request to update the application, and initiating patching upon identifying an update request. In one embodiment, the mount module 110 listens for the requests at 340. Upon identifying the update request, the mount module 110 locates a patch image and initiates the patching process at 350.

Accordingly, at 350, the application image 135 that is presently mounted with the working image 140 is swapped for a patched version of the application image 135. In one embodiment, swapping images at 350 includes un-mounting the application directory and storing the patched version of the application image 135 in the first data store 130 while archiving the previous version of the application image 135. That is, the mount module 110, at 350, un-mounts the application directory so that the application directory is, for example, temporarily unavailable. Thereafter, the application image 135 may be archived in the data store 130 or in a separate location. In either case, the previous version of the application image 135 is maintained as-is without modification in an original state. In this way, the previous version of the application image 135 is preserved.

Furthermore, using separate images to store the executables provides for configuring the patched version of the application image 135 in an out-of-band process. That is, instead of patching the application by modifying the application image 135 in-place, the executables are modified with a patch by a separate system or, more generally, outside of an operating environment of the application. Accordingly, the executables can be modified/patched separate from the executing application and checked to ensure proper configuration. Thereafter, the patched version of the application image 135 can be prepared and provided to the computing system 100 to be mounted as a read-only image so that the integrity and authenticity of the application image 135 is maintained throughout execution. In this way, patching the application encounters fewer difficulties from corrupted installations while also preserving previous versions of the executables.

At 360, an additional working image is generated. In one embodiment, the mount module 110 generates a new active working image 140 by generating an electronic data structure in the data store 145 as a framework of the new active working image 140 and assigning specific rights to the newly generated working image. For example, in one embodiment, the mount module 110 generates the new active working image 140 to replace an existing version of the working image 140 as the writable image. Accordingly, the existing version of the working image 140 is changed to be read-only and archived to preserve a current state of the application from just before patching.

In general, the mount module 110 generates the new active working image 140 by copying the directory structure of the application directory to the new active working image 140. In one embodiment, files stored in the existing working image 140 are copied to the new active version. However, in general, the new active working image 140 includes the directory structure of the application directory while files are not copied until being promoted to the working image 140 from previous versions of the working image or the application image 135 as needed. Promoting files to the active working image 140 will be discussed in greater detail with regards to method 400, subsequently. In either case, the mount module 110 generates the new active working image 140 to permit both reading and writing to the new active working image 140 while previous versions of the working image 140 are preserved as read-only In this way, working data of the patched application that is modified while the application is executing will be written to the new active working image 140 and previous versions of the working data will be preserved and no longer modified.

At 370, the configuration information is updated. In one embodiment, the mount module 110 updates the configuration information by loading the configuration file into a working memory, modifying the file to reflect the new active working image 140 and patch information, and storing the configuration file in the new active working image 140. In this way, information about the patch is updated to ensure that the patched version is loaded correctly.

After the application is patched at 350, 360, and 370, the images for the patched application are mounted, at 330, according to the updated configuration information. As discussed previously with block 330, the mount modules 110 mounts the images for a particular version together to form the application directory.

Consider the following example where the mount module 110 generates the application directory for a patched version of the application. In this example, the previous/original version of the application image 135 is indicated by 135, the patched version of the application image 135 is indicated as 135', the original working image 140 is indicated by 140, and the new active working image 140 is indicated by 140'. The mount module 110 originally mounted 135+140 to create the application directory. However, the application directory for the patched application is formed from 135'+140+140'. In this example, 135' and 140 are read-only while 140' is writable to accept newly modified working data.

Furthermore, a subsequently patched version may be indicated as a mount between 135"+140+140'+140". This example demonstrates how the application image 135 is swapped for a new patched version, while the working images 140 and 140' remain and 140" is added to accept data that is modified for the new version of the application. By swapping the application image and retaining the working images with the working data, the application can be patched while retaining configuration information and application state information stored in the working images 140 and 140'.

Further aspects of how the images are accessed will be discussed in relation to FIG. 4. FIG. 4 illustrates one embodiment of a method 400 associated with arbitrating access to an application directory that is a union of two or more images. As with method 300, method 400 will be discussed from the perspective of the computing system 100 of FIG. 1.

Accordingly, method 400 initiates when, for example, an access request to the application directory is received at 410. That is, at 410, requests are monitored to identify whether there is a request directed to the application directory. In one embodiment, the access module 115 monitors for requests to the application directory by parsing a stream of requests passing through a system kernel, identifying which requests of the stream pertain to the application directory, and re-directing requests intended for the application directory into the access module 115.

For example, the access module 115 actively monitors directory access requests in the computing system 100 by using a hook, port, or other available access through the system kernel. The directory access requests are, in general, requests to a file system that is controlled by the system kernel (i.e., operating system kernel) executing on the computing system 100. Furthermore, access requests to the application directory are generated by the application itself. That is, the application executing on the processor 125 and including files stored within the application directory, generates access requests to the files of the application directory.

In general, the access requests are requests to read and/or write new or existing files in the application directory and/or another memory such as the memory 120, the first data store 130, the second data store 145, the application directory and so on. Because files displayed with the application directory are located in separate images, addressing a file first includes the access module 115 locating the file in one of the images. Accordingly, at 420, a file that is specified by the request is located. In one embodiment, locating the file includes parsing the request to identify the file and iteratively searching through the separate images that comprise the application directory until a match for the file is located.

Accordingly, the access module 115 begins the search for the file by starting with an active working image (the working image 140). The access module 115 progresses through files of the active working image 140 searching for a match. If no match is found in the active working image 140, then the access module 115 proceeds to a next image in the stack. That is, since the application directory may be comprised of multiple working images from different versions, the access module proceeds through the stack until the file is located.

Additionally, because each subsequent working image is from a progressively older version of the application, the file may exist in different versions in different images. However, the access module 115 directs the request to a most recent image that includes the file since the file located in the most recent image is considered to be an active version of the file. Moreover, locating of the file is not necessary in an instance when the file is being newly created. Accordingly, if the file is being newly created, then the access module 115 proceeds to 460 where the file is written to the active working image 140, Once the file is located, at 420, whether the request is a request to modify data is determined, at 430. In one embodiment, the access module 115 determines whether the request is a request to modify data by parsing the request, identifying one or more fields in the request and determining whether values of the fields indicate that the request is a write request. Whether or not the request will cause a write operation is especially relevant in regards to where the file is located.

That is, the active working image 140 is, in one embodiment, writable/modifiable while the application image 135 and any intervening working images (not illustrated) are read-only to preserve content as it existed with a respective version of the application. Thus, if a write is to occur to a file that is located in a read-only image (i.e., any image except the active working image 140), then the write operation cannot proceed without further intervention.

Accordingly, at 440, an image associated with the file is determined. In one embodiment, the image is identified by parsing a path of the file and identifying whether the image in which the file is stored is the active working image 140 or another image. Thus, in one embodiment, the access module 115 identifies an actual storage location of the file at 440 to determine whether the file is modifiable. If the file is located in the active working image 140, then access is permitted at 460. However, if the file is not located in the active working image 140, then the location of the file is read-only. Thus, the access module 115 proceeds to block 450.

At 450, the file is promoted to the active working image 140. In one embodiment, promoting the file at 450 includes identifying a location of the file in the image, generating a copy of the file in a temporary storage (e.g., the memory 120), and transferring the copy to the active working image 140 at a same location in the directory structure as the original file. In this way, the original file is preserved in the originating image while providing a copy of the file for modification that is stored in the active working image 140. In this way, copies of files are progressively propagated into the active working image 140 as those files are modified. Additionally, because the application directory is a logical projection of the separate images mounted together only a single version of the file is shown. A previous version of the file is, for example, "eclipsed" by the promoted file in the active working image 140 since the promoted file is the active version of the file.

At 460, access to the file is provided. In one embodiment, the access to the file is provided by altering the original access request to re-direct the access request to the specific file instead of the representation provided in the application directory. Thereafter, the access module 115 provides for reading and/or writing to the file depending on the original request. Accordingly, the access module 115 arbitrates access to the files of the application as provided in the unified application directory by intercepting and re-directing the requests to appropriate locations and also selectively promoting files as needed.

Computing Device Embodiment

Figure 5:
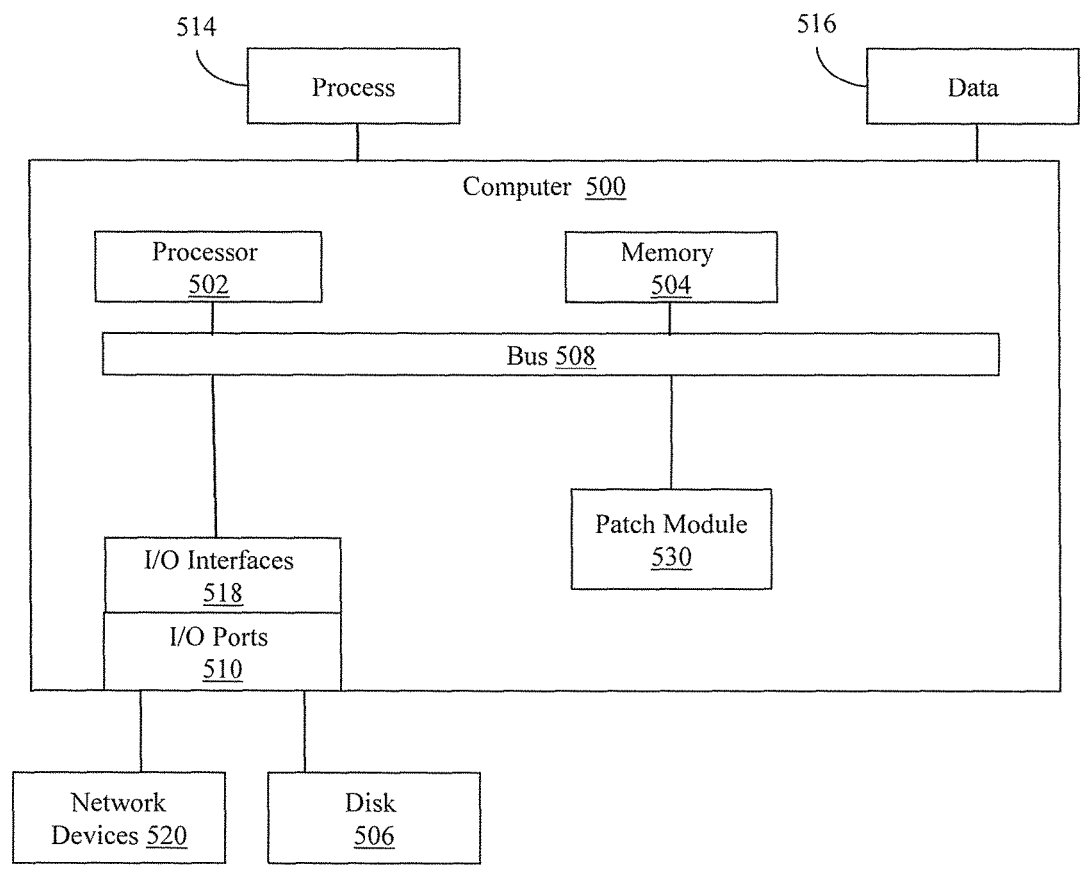
FIG. 5 illustrates an embodiment of a computing system configured with the example systems and/or methods disclosed.

FIG. 5 illustrates an example computing device that is configured and/or programmed with one or more of the example systems and methods described herein, and/or equivalents. The example computing device may be a computer 500 that includes a processor 502, a memory 504, and input/output ports 510 operably connected by a bus 508. In one example, the computer 500 may include patch module 530 configured to facilitate mounting multiple images together that include separate aspects of an application and provide access to files in the images similar to computing system 100 shown in FIG. 1. In different examples, the patch module 530 may be implemented in hardware, a non-transitory computer-readable medium with stored instructions, firmware, and/or combinations thereof. While the patch module 530 is illustrated as a hardware component attached to the bus 508, it is to be appreciated that in other embodiments, the patch module 530 could be implemented in the processor 502, stored in memory 504, or stored in disk 506.

In one embodiment, the patch module 530 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to mount separate images together as a single file system. The means may also be implemented as stored computer executable instructions that are presented to computer 500 as data 516 that are temporarily stored in memory 504 and then executed by processor 502.

Patch module 530 may also provide means (e.g., hardware, non-transitory computer-readable medium that stores executable instructions, firmware) for performing access to the file system implemented by merging two or more images together as a single file system and for patching an application comprised of the two or more images by swapping one or more images.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A storage disk 506 may be operably connected to the computer 500 via, for example, an input/output (I/O) interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The computer 500 may interact with input/output (I/O) devices via the I/O interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the I/O interfaces 518, and/or the I/O ports 510. Through the network devices 520, the computer 500 may interact with a network. Through the network, the computer 500 may be logically connected to remote computers. Networks with which the computer 500 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing instructions that when executed by one or more processors cause a computing device to perform at least:

mounting at least an application image together with a working image to create an application directory for an application, wherein the application image is read-only and includes at least an executable of the application, wherein the working image is modifiable and includes at least working data used by the application, wherein the application image is stored within a first data store in a first directory structure, and the working image is stored within a second data store in a second directory structure wherein the working data is separated from the executable of the application, and wherein the application directory provides files and paths of the files for the application image and the working image together within a single unified directory that combines the first directory structure of the application image and the second directory structure of the working image;

in response to receiving a request to update the application, patching the application by:

(i) swapping the application image with a patched version of the application image that includes at least a patched version of the executable, wherein the patched version of the application image is stored in the first data store;

(ii) rendering the working image read-only and generating a patch working image in the second data store; and (iii) mounting at least the patched version of the application image from the first data store, and the working image and the patch working image from the second data store to create a patched version of the application directory for the application; and during execution of the patched version of the executable, in response to receiving a write request to one or more files that are part of the patched version of the application image, identifying the one or more files as either (i) working files that are modifiable or (ii) executable files that are not modifiable, and promoting the one or more working files that are modifiable from the working image into the patch working image to allow the one or more files to be modified by the write request.

2. The non-transitory computer-readable medium of claim 1, wherein the instructions further comprise instructions that when executed by the one or more processors cause the computing device to perform at least:

in response to receiving an access request, analyzing the access request to identify whether the access request is to a file of the application image or a file of the working image;

in response to identifying that the access request is a request to write to a file of the application image or to write to a file of a previous version of the working image, promoting the file to the working image and redirecting the access request to the promoted file in the working image; and in response to identifying that the access request is a request to write to a file of the working image, providing read and write access to the file of the working image, wherein the write request is generated by an executing process of the application.

3. The non-transitory computer-readable medium of claim 1, wherein the instructions further comprise instructions that when executed by the one or more processors cause the computing device to perform at least:

generating the patch working image for storing newly generated working data when executing the patched version of the executable, and updating configuration information to reflect the patching, and wherein the patched version of the application image is read-only and replaces the application image.

4. The non-transitory computer-readable medium of claim 1, wherein the application directory provides a representation of the application image and the working image as a single merged version of the first directory structure and the second directory structure such that content of a first subfolder of the first directory structure and content of a corresponding first subfolder of the second directory structure are represented in the application directory in a same subfolder.

5. The non-transitory computer-readable medium of claim 1, wherein the instructions further comprise instructions that when executed by the one or more processors cause the computing device to perform at least:

installing the application by (i) generating the application image to store at least the executable within the first data store and generating the working image to store the working data within the second data store to separate the working data from the executable and (ii) generating configuration information identifying the application directory and information about the application, wherein the working data comprises non-executable data that is manipulated by processes of the application, wherein the application image comprises at least the executable that includes instructions executed by the one or more processors, and wherein the first directory structure and the second directory structure are distinct file systems.

6. The non-transitory computer-readable medium of claim 1, wherein the application directory is a union of two or more images that are part of a union file system implemented by the computing device, and wherein the application image and the working image include files of the application and a structure of the application directory for the files.

7. The non-transitory computer-readable medium of claim 1, wherein mounting at least the application image together with the working image to create the application directory maintains a root directory with a same path for subsequent patched versions of the application, wherein the working data includes state information, trace logs, and configuration files of the application that are modified when the application is executing, and wherein the application image includes at least the executable and libraries of the application.

8. The non-transitory computer-readable medium of claim 1, wherein mounting at least the application image together with the working image to create the application directory includes identifying images for a version of the application according to configuration information, wherein the images for the version include at least the application image comprising the executable, and one or more secondary images comprising previous versions of the working data, wherein the one or more secondary images include at least the working image.

9. The non-transitory computer-readable medium of claim 1, wherein the instructions further comprises instructions for monitoring for an access request provided through a system kernel, locating a file that is identified by the access request among images mounted to form the application directory, and redirecting the access request to an individual one of the images according to a location of the file within one of the images.

10. A computing system, comprising:
a processor;
a memory connected to the processor, wherein the memory stores at least:
a mount module including instructions that when executed by the processor cause the computing system to:
mount at least an application image together with a working image to create an application directory for an application,

19 wherein the application image is read-only and includes at least an executable of the application, wherein the working image is modifiable and includes working data used by the application, wherein the application image is stored within a first data store in a first directory structure, and the working image is stored within a second data store in a second directory structure wherein the working data is separated from the executable of the application, and wherein the application directory provides files and paths of the files for the application image and the working image together within a single unified directory that combines the first directory structure of the application image and the second directory structure of the working image, in response to receiving a request to update the application, patching the application by:
(i) swapping the application image with a patched version of the application image that includes at least a patched version of the executable, wherein the patched version of the application image is stored in the first data store;
(ii) rendering the working image read-only and generating a patch working image in the second data store; and
(iii) mounting at least the patched version of the application image from the first data store, and the working image and the patch working image from the second data store to create a patched version of the application directory for the application; and during execution of the patched version of the executable, in response to receiving a write request to one or more files that are part of the patched version of the application image, identify the one or more files as either (i) working files that are modifiable or (ii) executable files that are not modifiable, and promoting the one or more working files that are modifiable from the working image to the patch working image by at least copying the one or more files from the working image into the patch working image to allow the one or more files to be modified by the write request; and an access module including instructions that when executed by the processor cause the computing system to, in response to receiving a write request to the application directory, arbitrate access to the application directory by controlling the processor to write data for the write request to the working image to maintain the working data separate from the executable of the application, wherein the access module includes instructions to arbitrate access to the application directory by:
in response to receiving an access request, analyzing the access request to identify whether the access request is to a file of the application image or a file of the working image;
in response to identifying that the access request is a request to write to a file of the application image or to write to a file of a previous version of the working image, promoting the file to the working image and redirecting the access request to the promoted file; and
in response to identifying that the access request is a request to write to the working image, providing read

20 and write access to the working image, wherein the access request is generated by an executing process of the application.

11. The computing system of claim 10, wherein the analyzing the access request includes parsing a path to identify whether the image in which the file is stored is an active working image or another image.

12. The computing system of claim 10, wherein the mount module includes instructions to:
responsive to receiving a selection of an option for a version of the application during installation of the application, writing an executable that is particular to the version and installation associated with the option to the working image.

13. The computing system of claim 10, wherein the mount module includes instructions to:
install the application by (i) generating the application image to store at least the executable within the first data store and generating the working image to store at least the working data within the second data store to separate the working data from the executable and (ii) generating configuration information identifying the application directory and information about the application,
wherein the working data comprises non-executable data that is manipulated by processes of the application and the application image comprises at least the executable that includes instructions executed by the processor, and wherein the first directory structure and the second directory structure are in distinct file systems.

14. The computing system of claim 10, wherein the application directory is a union of two or more images as part of a union file system, and wherein the application image and the working image include files of the application and a directory structure of the application directory for the files.

15. The computing system of claim 10, wherein the mount module includes instructions to mount at least the application image and the working image to create the application directory and to maintain a root directory with a same path for subsequent patched versions of the application, wherein the working data includes state information, trace logs, and configuration files of the application that is modified when the application is executing, and wherein the application image includes at least the executable of the application.

16. The computing system of claim 10, further comprising:
an access module including instructions that when executed by the processor cause the computing system to arbitrate access to the application directory by monitoring for an access request provided through a system kernel, locating a file that is identified by the access request among images mounted to form the application directory, and redirecting the access request to an individual one of the images according to a location of the file within one of the images.

17. A computer-implemented method, the method comprising:
mounting, by at least a processor, an application image together with a working image to create an application directory for an application, wherein the application image is read-only and includes at least an executable of the application, wherein the working image is modifiable and includes working data modified by the application,
wherein the application image is stored within a first data store in a first directory structure, and the working image is stored within a second data store in a second directory structure wherein the working data is separated from the executable of the application, and wherein the application directory provides files and paths of the files for the application image and the working image together within a single unified directory that combines the first directory structure of the application image and the second directory structure of the working image;

in response to receiving a request to update the application, patching the application by:
  (i) swapping the application image with a patched version of the application image that includes at least a patched version of the executable, wherein the patched version of the application image is stored in the first data store;
  (ii) rendering the working image read-only and generating a patch working image in the second data store; and
  (iii) mounting at least the patched version of the application image from the first data store, and the working image and the patch working image from the second data store to create a patched version of the application directory for the application; and during execution of the patched version of the executable, in response to receiving a write request to one or more files that are part of the patched version of the application image, identifying the one or more files as either (i) working files that are modifiable or (ii) executable files that are not modifiable, and promoting the one or more working files that are modifiable from the working image to the patch working image by at least copying the one or more files from the working image into the patch working image to allow the one or more files to be modified by the write request.

18. The computer-implemented method of claim 17, further comprising:
  in response to receiving a write request to the application directory, arbitrating, by at least the processor, access to the application directory by controlling the processor to write data for the write request to the working image to maintain the working data separate from the executable of the application;
  in response to receiving an access request to the application directory, analyzing the access request to identify whether the access request is to a file of the application image or a file of the working image;
  in response to identifying that the access request is a request to write to a file of the application image or to write to a file of a previous version of the working image, promoting the file to the working image and redirecting the access request to the promoted file; and
  in response to identifying that the access request is a request to write to a file of the working image, providing read and write access to the file of the working image.

19. The computer-implemented method of claim 17, further comprising:
  (i) generating the patch working image for storing newly generated working data when executing the patched version of the executable, and
  (ii) updating configuration information to reflect the patching, wherein the patched version of the application image is read-only and replaces the application image.

20. The computer-implemented method of claim 17, further comprising:
  installing the application by (i) generating the application image to store at least the executable within the first data store and generating the working image to store at least the working data within the second data store to separate the working data from the executable and (ii) generating configuration information identifying the application directory and information about the application,
  wherein the working data comprises at least non-executable data that is manipulated by processes of the application and the application image comprises at least the executable that includes instructions executed by a processor, and wherein the application image and the working image are distinct file systems.

* * * * *

UNITED STATES PATENT AND TRADEMARK OFFICE
CERTIFICATE OF CORRECTION

PATENT NO. : 10,346,150 B2  
APPLICATION NO. : 15/142233  
DATED : July 9, 2019  
INVENTOR(S) : Bagal et al.

Page 1 of 1

It is certified that error appears in the above-identified patent and that said Letters Patent is hereby corrected as shown below:

In the Specification

In Column 11, Line 29, delete "read-only" and insert -- read-only. --, therefor.

In Column 12, Line 63, delete "140," and insert -- 140. --, therefor.

Signed and Sealed this  
Twenty-eighth Day of July, 2020

Andrei Iancu  
*Director of the United States Patent and Trademark Office*